United States Patent
Denton

(10) Patent No.: US 10,544,879 B2
(45) Date of Patent: Jan. 28, 2020

(54) SONIC FLOW CONTROL VALVE

(71) Applicant: Moog Inc, East Aurora, NY (US)

(72) Inventor: Brandon Denton, Kenmore, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 15/410,491

(22) Filed: Jan. 19, 2017

(65) Prior Publication Data

US 2017/0211481 A1 Jul. 27, 2017

Related U.S. Application Data

(60) Provisional application No. 62/286,745, filed on Jan. 25, 2016.

(51) Int. Cl.
| F16K 47/04 | (2006.01) |
| F16K 47/08 | (2006.01) |
| F16K 1/12 | (2006.01) |
| F16K 1/54 | (2006.01) |

(52) U.S. Cl.
CPC ................. *F16K 47/04* (2013.01)

(58) Field of Classification Search
CPC ..... F16K 1/12; F16K 1/38; F16K 1/54; F16K 47/04; F16K 47/08
USPC .................................. 251/122, 124
See application file for complete search history.

(56) References Cited

U.S. PATENT DOCUMENTS

| 2,087,621 A | 7/1937 | Lorraine | |
| 2,891,570 A | 6/1959 | Krupp | |
| 3,298,389 A * | 1/1967 | Freeman | F16K 1/12 251/122 |
| 3,499,456 A | 3/1970 | Rerecich | |
| 3,848,806 A | 11/1974 | Samuelson et al. | |
| 3,889,537 A | 6/1975 | Khuzaie | |
| 4,413,646 A * | 11/1983 | Platt | F16K 25/04 251/122 |
| 4,688,755 A | 8/1987 | Pluviose | |
| 4,707,278 A | 11/1987 | Breyer et al. | |
| 4,721,284 A | 1/1988 | Bankard | |
| 5,368,273 A * | 11/1994 | Dante | F02C 7/232 251/122 |
| 6,105,614 A | 8/2000 | Bohaychuk et al. | |
| 6,250,602 B1 | 6/2001 | Jansen | |

(Continued)

FOREIGN PATENT DOCUMENTS

| DE | 4233207 A1 | 4/1994 |
| JP | S38022432 | 6/1961 |
| JP | S6260770 U | 4/1987 |

*Primary Examiner* — Eric Keasel
(74) *Attorney, Agent, or Firm* — Harter Secrest & Emery LLP

(57) ABSTRACT

A flow control valve comprising a valve body having a valve throat, a narrowing nozzle passage upstream of the valve throat, a valve member having an outer narrowing surface and movable relative to the valve body to meter flow through the valve throat, a widening diffusor passage, a widening passage downstream of an inlet port and upstream of the narrowing nozzle passage, and the widening portion widening from a first section having a first cross-sectional area that is equal to or greater than the cross-sectional area of the inlet port to a second section downstream a distance from the first section and having a second cross-sectional area that is greater than the cross-sectional area of the first section of the widening portion.

11 Claims, 10 Drawing Sheets

(56) References Cited

U.S. PATENT DOCUMENTS

| | | | |
|---|---|---|---|
| 7,044,434 B2* | 5/2006 | Brinks | F16K 1/38 |
| | | | 251/122 |
| 7,137,612 B2 | 11/2006 | Baca | |
| 8,038,121 B2* | 10/2011 | Gessaman | F16K 1/38 |
| | | | 251/122 |
| 8,186,646 B2* | 5/2012 | Geelhart | F16K 1/422 |
| | | | 251/122 |
| 2003/0062495 A1* | 4/2003 | Long | F16K 1/38 |
| | | | 251/122 |
| 2003/0089869 A1 | 5/2003 | Hall et al. | |
| 2007/0001134 A1 | 1/2007 | Lonnes | |
| 2007/0114480 A1 | 5/2007 | Burke | |
| 2007/0193752 A1 | 8/2007 | Kim | |
| 2008/0149200 A1 | 6/2008 | Burkhard et al. | |
| 2009/0078906 A1 | 3/2009 | Shafer et al. | |
| 2009/0256089 A1 | 10/2009 | Colding-Kristensen et al. | |
| 2011/0001074 A1 | 1/2011 | Szymaszek | |
| 2012/0074346 A1 | 3/2012 | Cook | |
| 2014/0231023 A1 | 8/2014 | Cazzanti et al. | |

* cited by examiner

SONIC FLOW CONTROL VALVE

TECHNICAL FIELD

The present invention relates generally to gas turbine fuel control valves and, more particularly, to an improved sonic flow control valve.

BACKGROUND ART

Combustion turbines generally take in air and compress the air in a compression turbine stage. Gas or oil fuel is metered into a combustion chamber and the resulting hot exhaust gas then passes over the turbine blades creating torque on a shaft. Typically the shaft is connected to a generator that then produces electricity. The metering of the fuel in the combustion chamber controls the speed of the turbine as the load varies U.S. Pat. No. 7,044,434, issued May 16, 2006, and entitled "High Recovery Sonic Gas Valve," is directed to a gas valve design in which the inlet flow enters the valve transverse or orthogonal to the outlet flow. The gas control valve controls the flow of gas, including air and/or fuel, for an industrial or gas turbine or other flow control system. The valve is described as providing sonic flow through the nozzle throat per pressure ratios (P1/P2) at or above approximately 1.04. The valve is disclosed as having a valve body with a gas inlet, a gas outlet and a nozzle throat for a valve needle. The valve needle has a contoured surface that is shaped to provide a desired gas flow versus actuator piston stroke and the valve nozzle has a converging flow where the flow path cross-sectional area is reducing along the direction of flow. The entire contents of U.S. Pat. No. 7,044,434 are incorporated herein by reference.

U.S. Pat. No. 7,137,612, issued Nov. 21, 2006, and entitled "High Recovery Metering Valve," is directed to a metering valve having an inlet, an outlet, and a plenum. A valve poppet is moveably positioned within the internal valve trim and the valve poppet includes a distal portion that is tapered. The inlet and the outlet of the valve are orientated about ninety degrees with respect to each other. The valve is described as providing improved pressure recovery. The entire contents of U.S. Pat. No. 7,137,612 are incorporated herein by reference.

BRIEF SUMMARY

With parenthetical reference to corresponding parts, portions or surfaces of the disclosed embodiment, merely for the purposes of illustration and not by way of limitation, a flow control valve (15, 115) is provided comprising: a valve body (16, 116) having an internal flow passage (18, 118) comprising an inlet port (19) orientated about an inlet axis (20), a valve throat (22), a curved inlet passage (23, 123) between the inlet port and the valve throat, an outlet port (24) orientated about an outlet axis (25), and an outlet passage (26) between the valve throat and the outlet port, wherein the internal flow passage forms a flow path (28, 128) between the inlet port and the outlet port; the inlet passage comprising a narrowing nozzle passage (29) upstream of the valve throat having an uninterrupted surface (30) generally converging toward the valve throat; a valve member (31) moveably mounted at least partially within the valve throat and comprising a stem (32) and a metering portion (33) having an outer narrowing surface (34) generally converging in a downstream direction and movable relative to the valve body to meter flow through the valve throat; the outlet passage comprising a widening diffusor passage (35) downstream of the valve throat having a surface (36) generally diverging away from the valve throat; the inlet passage comprising a widening portion (38, 138, 144) downstream of the inlet passage and upstream of the narrowing nozzle passage; the inlet port having a cross-sectional area in a plane (39) generally perpendicular to the inlet axis; and the widening portion widening from a first section (40, 140) having a first cross-sectional area in a plane (41, 141) generally perpendicular to the flow path that is equal to or greater than the cross-sectional area of the inlet port to a second section (42, 142) downstream a distance (51, 151) from the first section and having a second cross-sectional area in a plane (43, 143) generally perpendicular to the flow path that is greater than the cross-sectional area of the first section of the widening portion.

The inlet passage may comprise a bending portion (44) curving downstream away from the input axis and the widening portion (38) of the inlet passage may be upstream of the bending portion of the inlet passage.

The respective surfaces of the narrowing nozzle passage and the widening diffuser passage may comprise linear angled sides or non-linear sides. The respective surfaces of the narrowing nozzle passage and the widening diffuser passage may comprise a frusto-conical surface. The internal flow passage may comprise an intermediate passage between the narrowing nozzle passage and the widening diffuser passage and the intermediate passage may be substantially cylindrical.

The narrowing nozzle passage may have a nozzle cross-sectional area (47) in a plane (54) perpendicular to the flow path that increases with a distance (48) upstream from the valve throat. The widening diffuser passage may have a cross-sectional area (53) in a plane (49) perpendicular to flow path that increases with a distance (50) downstream from the valve throat. The valve member and the valve throat may be axially aligned on a common axis (25) extending generally perpendicular to the inlet axis. The outlet axis may be aligned on a common axis with the valve member and the valve throat.

The valve may comprise an actuator (52) connected to the stem of the valve member and configured to move the metering portion between a closed position and an open position. The actuator may be selected from a group consisting of a linear actuator, an electro-mechanical actuator, an electro-hydrostatic actuator, an electro-hydraulic linear actuator and a hydraulic linear actuator.

The valve may be configured to flow gaseous fluids in a supersonic velocity range through the valve throat. The valve may be configured to flow gaseous fluids in a transonic velocity range through the valve throat. The valve may be configured to flow gaseous fluids at a velocity greater that about Mach 0.9 through the valve throat, and the valve may be configured to flow gaseous fluids at a velocity less that about Mach 1.1 through the valve throat. The valve may be configured to flow gaseous fluids through the valve throat uniformly about a central axis (25) of the valve throat.

The inlet passage may be defined by a surface (60, 160, 61, 161, 62, 30) having only a valve stem port (58, 158) and a substantially circular cross-section in a plane generally perpendicular to the flow path all along the flow path.

DETAILED DESCRIPTION OF THE EMBODIMENTS

Figure 1:
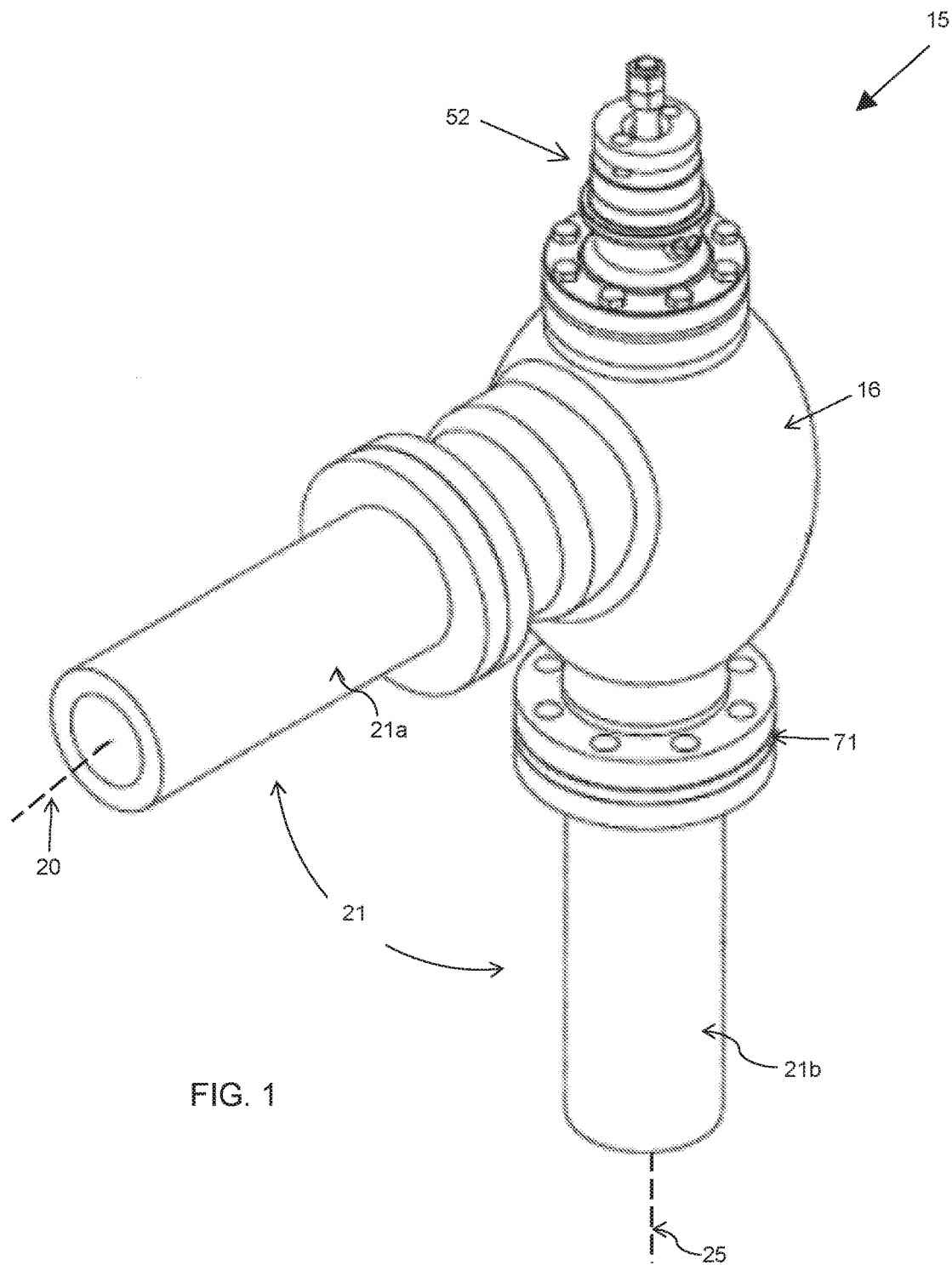
FIG. 1 is a perspective view of an embodiment of the flow control valve in a fuel intake passage of a gas turbine.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, a flow control valve is provided, of which a first embodiment is generally indicated at 15. In this embodiment, valve 15 is employed in a conventional gas turbine. The combustion turbine generally takes air and compresses the air in a compression turbine stage. Gas fuel is metered into combustion chamber, resulting in hot exhaust gas passing over the turbine blades of the gas turbine and creating a torque on the shaft of the gas turbine, which in turn powers an electric generator and produces electricity. Sonic valve assembly 15 is provided to meter the fuel flow through fuel intake passage 21 leading to the turbine combustion chamber.

As shown in FIGS. 1-5, sonic control valve 15 is positioned in fuel intake passage 21 and generally comprises stationary valve body 16 and adjustable valve plug 33 to modulate the fuel through throat 22 of valve 15. Metering plug 33 is connected by valve stem 32 and a coupling to output shaft 70 of linear actuator 52, which modulates the position of metering plug 33 at a high frequency and therefore the flow of fuel through the valve.

Valve body 16 includes inlet passage 23, which narrows to define throat 22, outlet passage 26, and sonic nozzle 71. It is understood that the fluid flow is in the direction of arrows 28 such that the fluid flows from inlet passageway 23 through throat 22 and out outlet passageway 26. Sonic nozzle 71 is sandwiched between the respective connection flanges of valve body 16 and conduit 21b to provide and align passage surfaces 62, 30 and 36 of valve flow passage 18.

Valve plug 33 is moveable longitudinally along axis 25 between a closed position and the open position. In the closed position, metering plug 33 is seated in throat 22 of valve body 16 with sufficient force to assure an almost leak free seal. In the open position, metering plug 32 is moved up and away from the seat such that the valve flows gas or fluid at a flow rate near or greater than Mach 1, and preferably between about Mach 0.9 and about Mach 1.1. The modulation of such flow can be controlled by moving valve plug 33 in throat 22 closer or further away from the valve seat. In this embodiment, throat 22 is generally defined by a curved annular surface.

Figure 2:
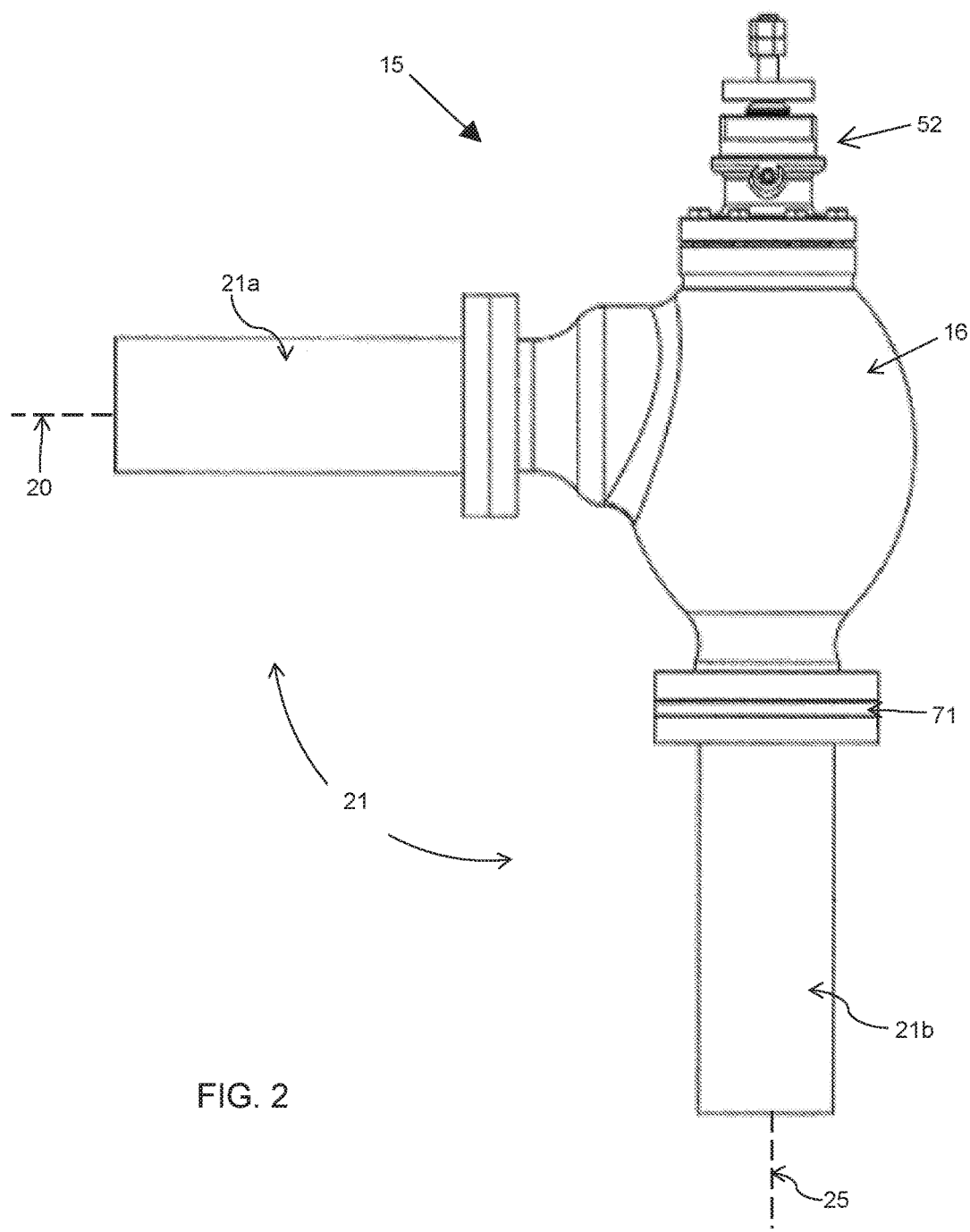
FIG. 2 is a front view of the flow control valve shown in FIG. 1.

Fuel intake passage 21 generally includes valve inlet conduit 21a and a valve outlet conduit 21b with valve 15 therebetween, as shown in FIGS. 1 and 2. The upstream side of valve 15 is on the upstream side of throat 22 and the downstream side of valve 15 is downstream of throat 22. Internal flow passage 18 of valve 15 extends between inlet conduit 21a of fuel intake passage 21 and outlet conduit 21b of fuel intake passage 21. On the upstream side of throat 22, inlet passage 23 extends from inlet port 19 at the junction with valve inlet conduit 21a to throat 22 and consists of, moving upstream to downstream from inlet port 19, widening passage 38, bending passage 44, cylindrical passage 46 and nozzle passage 29. On the downstream side of throat 22, outlet passage 26 connects to outlet conduit 21b at outlet port 24 and includes diffuser passage 35. As shown in FIGS. 1 and 2, inlet port 19 is orientated about inlet axis 20 and outlet port 24 is orientated about outlet axis 25. In this embodiment, inlet axis 20 and outlet axis 25 are perpendicular or orthogonal to each other.

Figure 4:
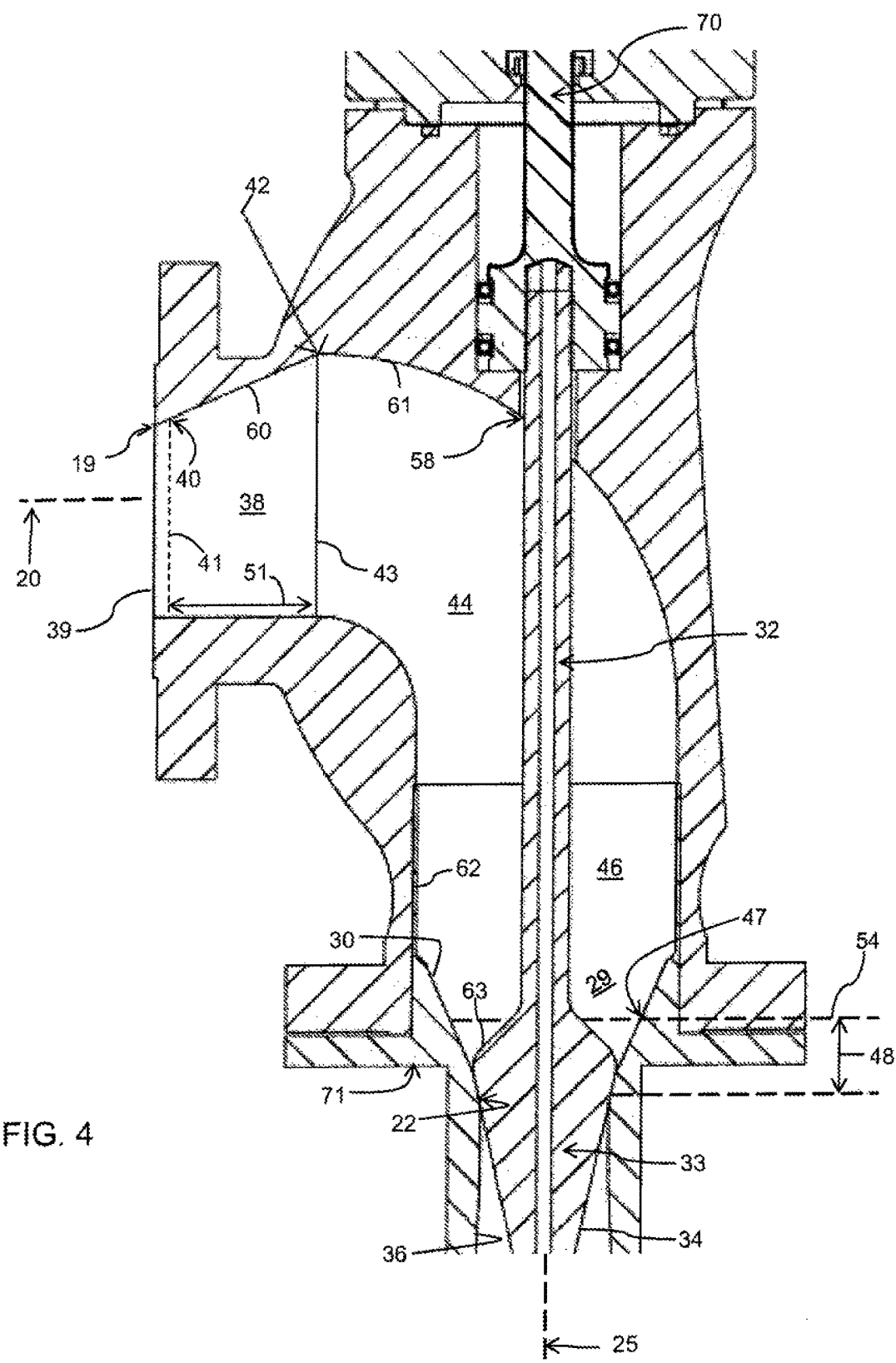
FIG. 4 is an enlarged view of the inlet passage of the flow control valve shown in FIG. 3.
Figure 5:
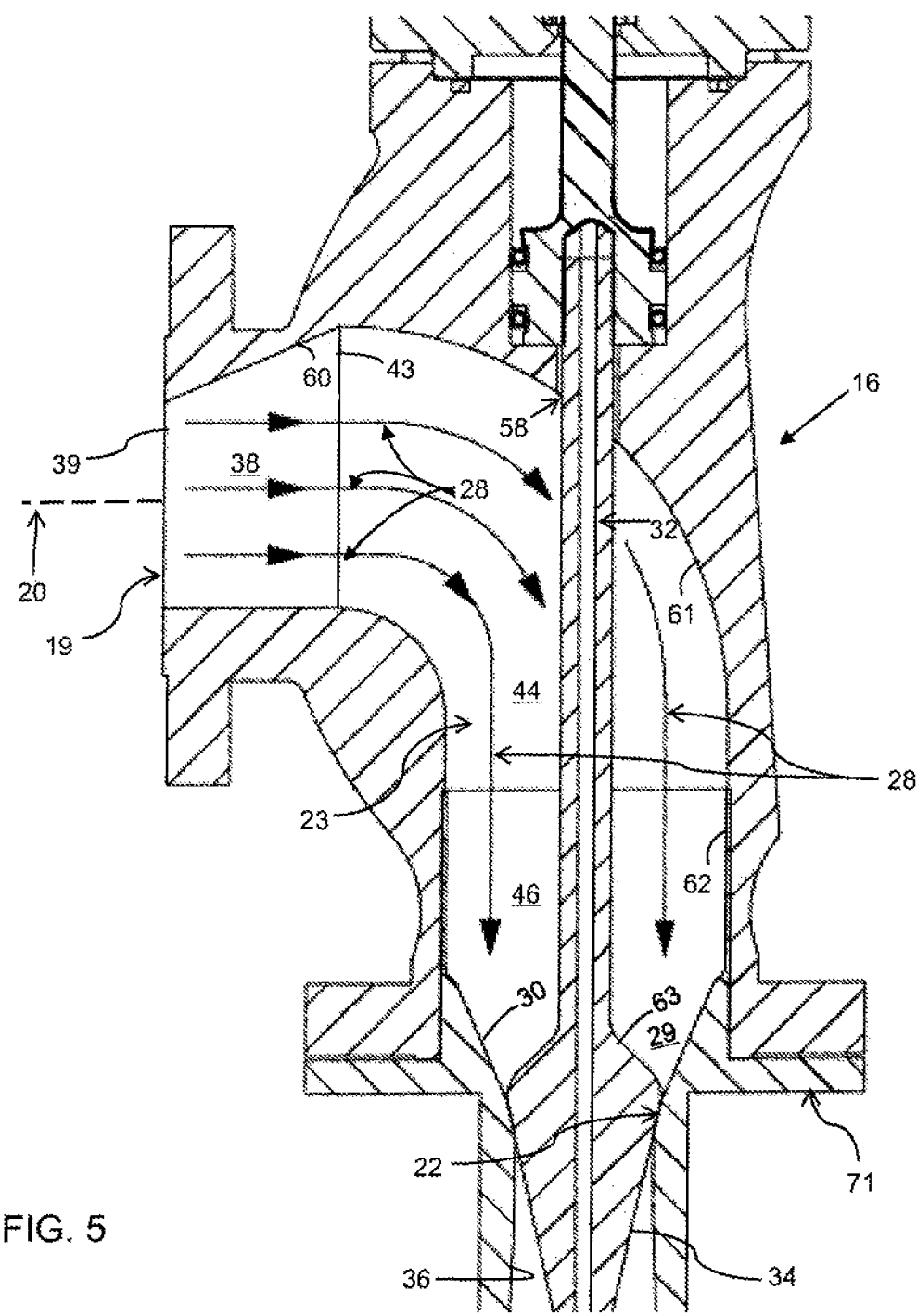
FIG. 5 is a further enlarged view of the widening portion of the inlet passage shown in FIG. 4.

Inlet widening passage 38 of inlet passage 23 is defined by rightwardly and inwardly-facing oblique frusto-conical surface 60. With reference to FIG. 4, if cross-section 43 is viewed as the base, an imaginary vertex of oblique conical surface 60 is not aligned with the center of circular cross-section 43, but is aligned with a point on the bottom of the circumference of cross-section 43, such that frusto-conical surface 60 is oblique or tilts to one side and the truncation plane of the oblique cone is parallel with cross-section 43 and is at inlet plane 39. Thus, as shown, the cross-sectional area of widening passage 38, taken in a plane perpendicular to the flow path, increases with distance 51 downstream. Accordingly, the cross-sectional area at section 42 taken on plane 43 a distance 51 downstream from section 40 is greater than the cross-sectional area at section 40 taken on plane 41. As shown, the widest point of widening passage or portion 38 of inlet passage 23 is at plane 43, immediately preceding bending passage or portion 44 of inlet passage 23. Thus, in this embodiment, the widening portion 38 of inlet passage 23 is upstream of bending portion 44 of inlet passage 23. This widening downstream of inlet 19 provides a number of benefits, discussed below, with respect to flow further downstream through throat 22.

Oblique frusto-conical surface 60 is joined at its right annular end to the left annular end of inwardly-facing curved surface 61. Curved surface 61 has a constant circular cross-sectional area in a plane perpendicular to the flow path from its junction with surface 60 to its downstream junction with surface 62. Such cross-section area is the same as the cross-sectional area of widest section 43 of widening surface 60. Surface 61 has a continuous uninterrupted circular cross-section except solely for stem port 58. As shown, surface 61 is broken only by stem port 58, through which valve stem 32 extends and moves linearly with linear movement of actuator shaft 70. As shown, bending passage 44 turns flow 28 ninety degrees from flowing generally parallel to input axis 20 to flowing generally parallel to outlet axis 25. The bottom annular end of surface 61 is joined to the top annular end of inwardly-facing cylindrical surface 62 of passage 46. Cylindrical surface 62 is a substantially straight cylindrical surface having a constant circular cross-sectional area along its length and being uninterrupted and continuous. The bottom annular edge of surface 62 is joined to the top annular edge of nozzle surface 30.

Nozzle passage 29 is defined by upwardly and inwardly-facing frusto-conical nozzle surface 30. As shown, nozzle surface 30 is a right frusto-conical surface which narrows moving upstream to downstream and is generally in the shape of a funnel. As shown, the cross-sectional area of nozzle passage 29, taken in a plane perpendicular to the flow path, decreases with distance 48 downstream. Accordingly, the cross-sectional area at throat 22 a distance 48 downstream from section 47 is less than the cross-sectional area at section 47 taken on plane 54, which is less than the cross-sectional area at the junction with passage 46 and surface 62. Thus, nozzle passage 29 and surface 30 are tapered and contoured to provide a converging and accelerating flow, with the flow path cross-section area decreasing along the direction of the flow. Uninterrupted converging contoured passage surface 30 is located upstream of nozzle throat 22. The surfaces of passage 29 narrow and accelerate the gas flow upstream of the plug seat and throat 22.

Throat 22 is the smooth curved junction between upper inwardly converging angled surface 30 and lower outwardly diverging angled surface 36. In this embodiment, throat 22 generally occurs at the minimum cross-sectional area between plug 33 and sonic nozzle 71 of valve body 16.

Figure 3:
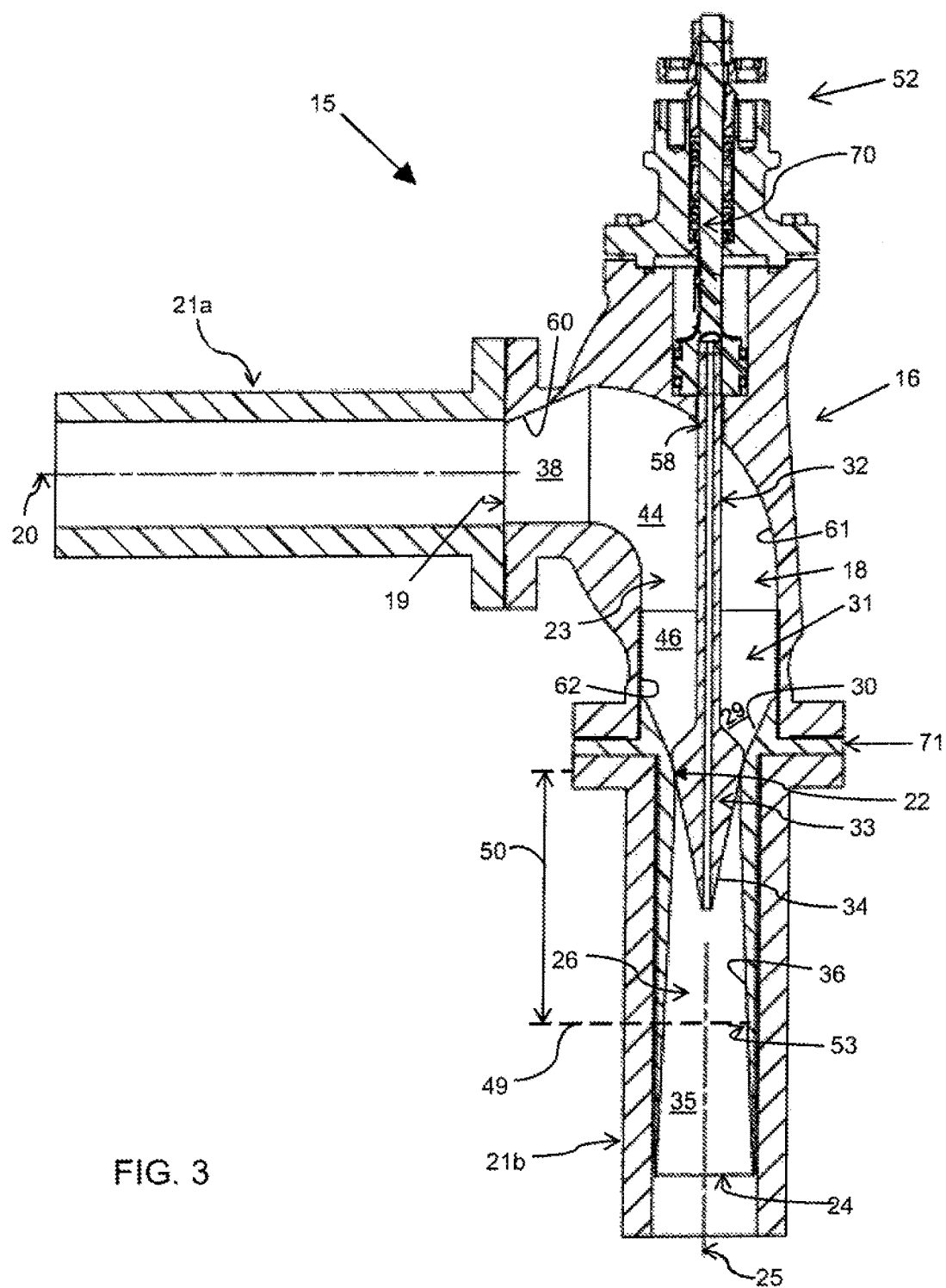
FIG. 3 is a vertical sectional view of the flow control valve shown in FIG. 2.

As shown in FIG. 3, outlet passage 26 generally comprises diffuser passage 35 extending from throat 22 to outlet port 24. Diffuser passage 35 is defined by downwardly and inwardly-facing frusto-conical surface 36 and is tapered and contoured to provide a diverging and decelerating flow, with the flow path cross-section area increasing along the direction of flow 28. Thus, as shown, the cross-sectional area of diffuser surface 36, taken in a plane perpendicular to the flow path, increases with distance 50 downstream. Accordingly, the cross-sectional area at section 53 taken on plane 49 a distance 50 downstream from throat 22 is greater than the cross-sectional area at throat 22.

Accordingly, internal flow passage 18 of valve body 16 is generally defined by continuous circular cross-sectional surfaces 60, 61, 62, 30, and 36, with the only interruption in such surfaces being inlet port 58. Such surfaces do not need to be convex or concave or specially curved to achieve the desired flow performance through throat 22 due to the unexpected effects of upstream widening portion 38 of inlet passage 23.

Figure 9:
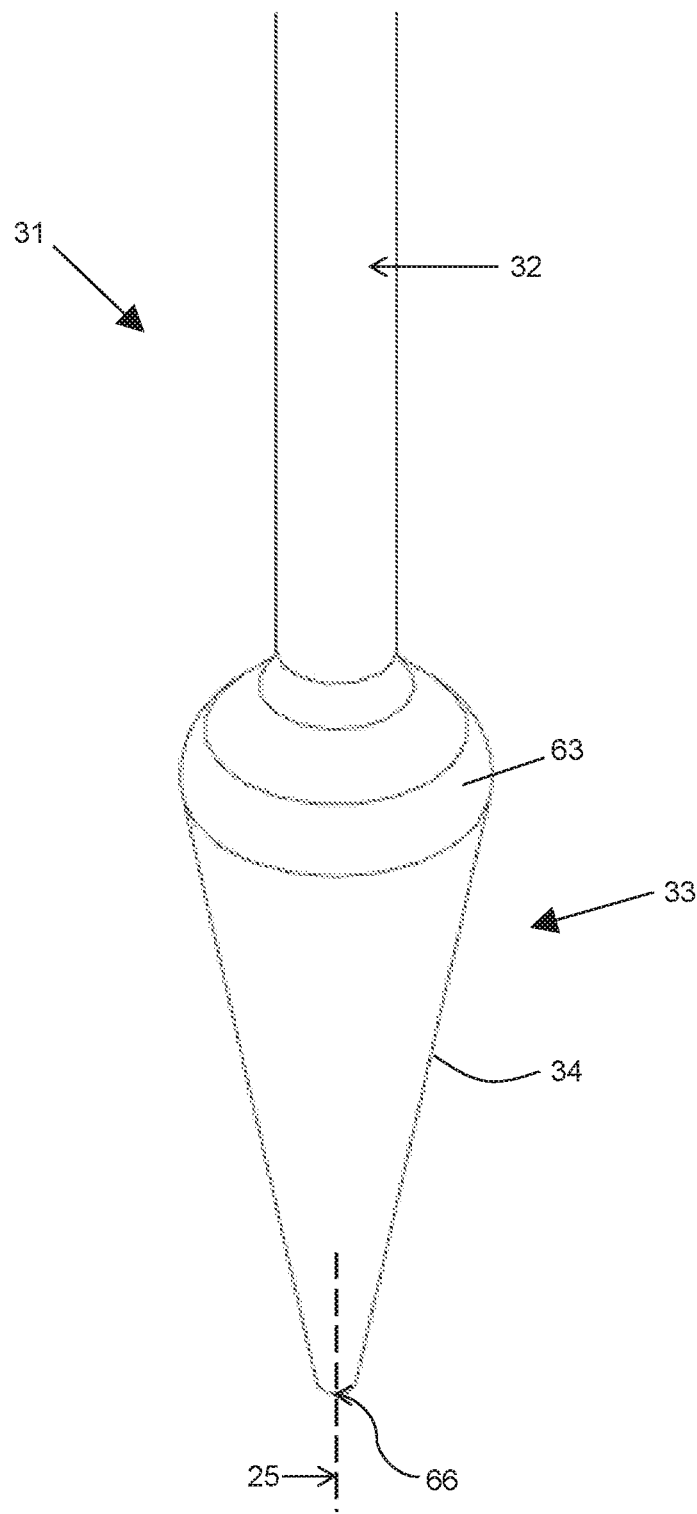
FIG. 9 is an enlarged perspective view of the valve plug shown in FIGS. 3 and 6.
Figure 10:
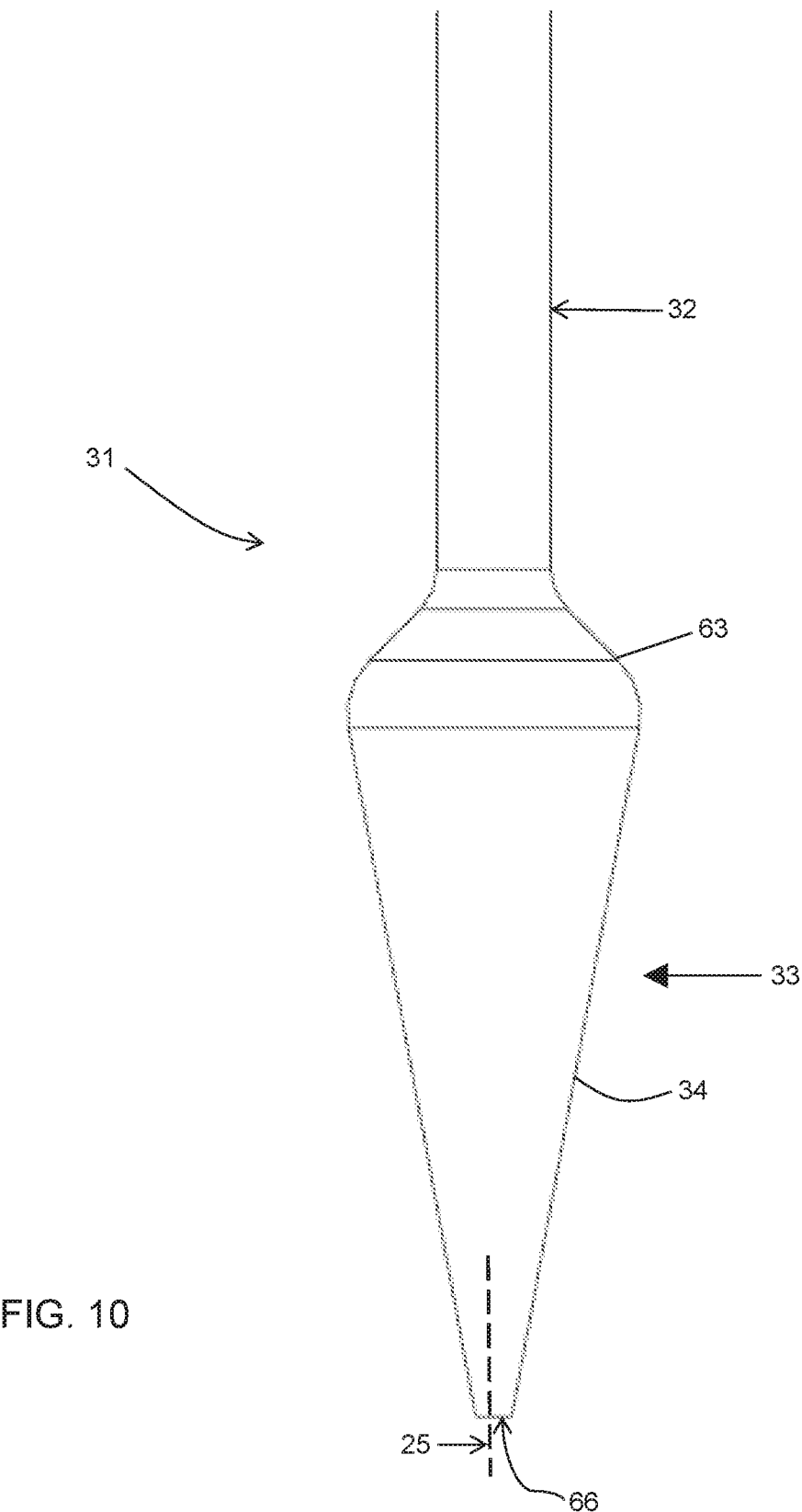
FIG. 10 is a front view of the valve plug shown in FIG. 9.

As shown in FIGS. 9 and 10, valve plug 33 has a contoured surface that is shaped to provide a desired gas flow versus actuator shaft 70 stroke. In this embodiment, the top or upstream side of valve plug 33 includes upwardly and outwardly-facing domed surface 63 joined at its upper inner annular edge to valve stem 32. The bottom or downstream side of valve plug 33 generally comprises outwardly and downwardly-facing frusto-conical surface 34 joined at its upper annular marginal edge to the lower annular marginal edge of domed surface 63 and tapering inwardly therefrom at a constant angle relative to axis 25, ending downstream at plug tip 66. Thus, plug 33 has a curved tapered upstream surface 63 in which the diameter of plug 33 increases in the direction of flow, and has a conical downstream surface 34 in which the diameter of plug 33 decreases in the direction of flow.

Valve 15 exhibits a desired low pressure drop ratio factor. The critical pressure ratio (P1/P2) for a valve is defined as the ratio of inlet pressure (P1) to outlet pressure (P2) where the valve flow rate drops below some percentage of the sonic flow rate. Valve 15 achieves sonic flow at low pressure ratios and provides a curved flow path from the inlet passage to force inlet flow into the nozzle area 29 in a more uniform manner causing a more uniform flow condition around the circumference of nozzle throat 22. This is achieved despite the fact that inlet pipe 21a is orthogonal to outlet pipe 21b such that the gas flow 28 turns ninety degrees or transverse from inlet 19 to outlet 24 and despite the circular cross-sectional aspect of the nozzle passage surfaces and plug. Widening portion 38 upstream of throat 22 and downstream of the inlet port 19, which is circular in cross-section, significantly diminishes the effect of the gas flow entering orthogonal or perpendicular to axis 25 of valve throat 22 and diffuser 35 and flowing through circular cross-section passages. Valve passage 18, including inlet passage 23, has both a substantially circular cross-section to the flow path and has a ninety degree bend. However, widening upstream passage 23 and outlet passage 26 may be provided in other cross-sectional profiles and for other transverse flow path angles.

Sonic gas flow valve 15 has a velocity in throat 22 (narrowest section) near or greater than Mach 1, and preferably between about Mach 0.9 and about Mach 1.1. Thus, linear motor sonic valve flow valve assembly 15 is optimized to deliver sonic flow at extremely low pressure drops. Valve 15 utilizes stationary metering body 16 and adjustable metering plug 33 to meter the fuel through the valve. The geometry of plug 33 and flow passage 18 are such that they accelerate the flow prior to choke point 22 such that choke metering point 22 has gas flow which is near or at supersonic speed. The new valve body and plug geometry delivers both high Cg throughput flow and low pressure drop across the valve at a sonic speed at metering choke point 22. This allows the Cg at a given valve stroke to remain relatively constant independent of the upstream pressure.

Thus, valve 15 provides high pressure recovery. Widening passage 38 from inlet 19 is an expanding section which decelerates the flow prior to making a constant cross-sectional ninety degree turn in passage 44. The deceleration of the flow is intended to minimize the potential pressure loss effects due to the turn in bending passage 44. Once turned, fluid passes through convergent/divergent sonic nozzle 71 which limits the mass flow through the valve and recovers the static fluid pressure for use in the downstream engine. Convergent/divergent nozzle 71 features a conical convergent section 29, throat 22, and contoured divergent section 35, maximizing pressure recovery.

Actuator 52 controls the movement of valve plug 33 relative to sonic nozzle 71. In this embodiment, actuator 52 is a linear magnetic motor actuator configured to actuate plug 33 in valve body 16 between the open and closed positions. In this embodiment, linear magnetic motor 52 is a three-phase permanent magnet linear DC electric motor having stationary stator, sliding shaft and position transducer or LVDT for measuring the linear displacement and position of the shaft. Output shaft 70 is driven to move linearly (that is, as a straight line translation) with respect to the stator assembly. The stator is a generally hollow cylindrical member elongated about axis 25 and having an inner cylindrical passage. Shaft 70 is a generally cylindrical member coincident with the stator and moves linearly along axis 25 through the stator passage relative to the stator. Movement along axis 25 is referred to herein as movement in the axial direction. The motor shaft generates magnetic fields by virtue of having a series of built in permanent magnets and the stator generates magnetic fields through a series of annular magnetic coils. By timing the flow of current in coils with respect to the position or momentum of the shaft, the interaction of magnetic forces from the shaft and the stator will actuate the shaft to move. Thus, linear motor 52 uses both the constant magnetic force generated by a plurality of permanent magnets and the controllable magnetic flux generated through the use of electromagnetic coils to produce motion of output shaft 70 relative to the stator, which is fixed to valve body 16.

Output shaft 70 is connected to plug stem 32 by a coupling, which provides guidance and seals actuator 52 from passage 18. Power supplied to linear actuator 52 generates a magnetic field within the coils of the stator, which in turn imparts an oscillating force on the magnetic shaft and output shaft 70. Shaft 70 is thereby translated linearly relative to the stator, which thus imparts linear movement to plug stem 32 and plug 33 relative to valve body 16. Linear electric motor 52 thus enables plug 33 of valve member 31 to reciprocate.

Figure 6:
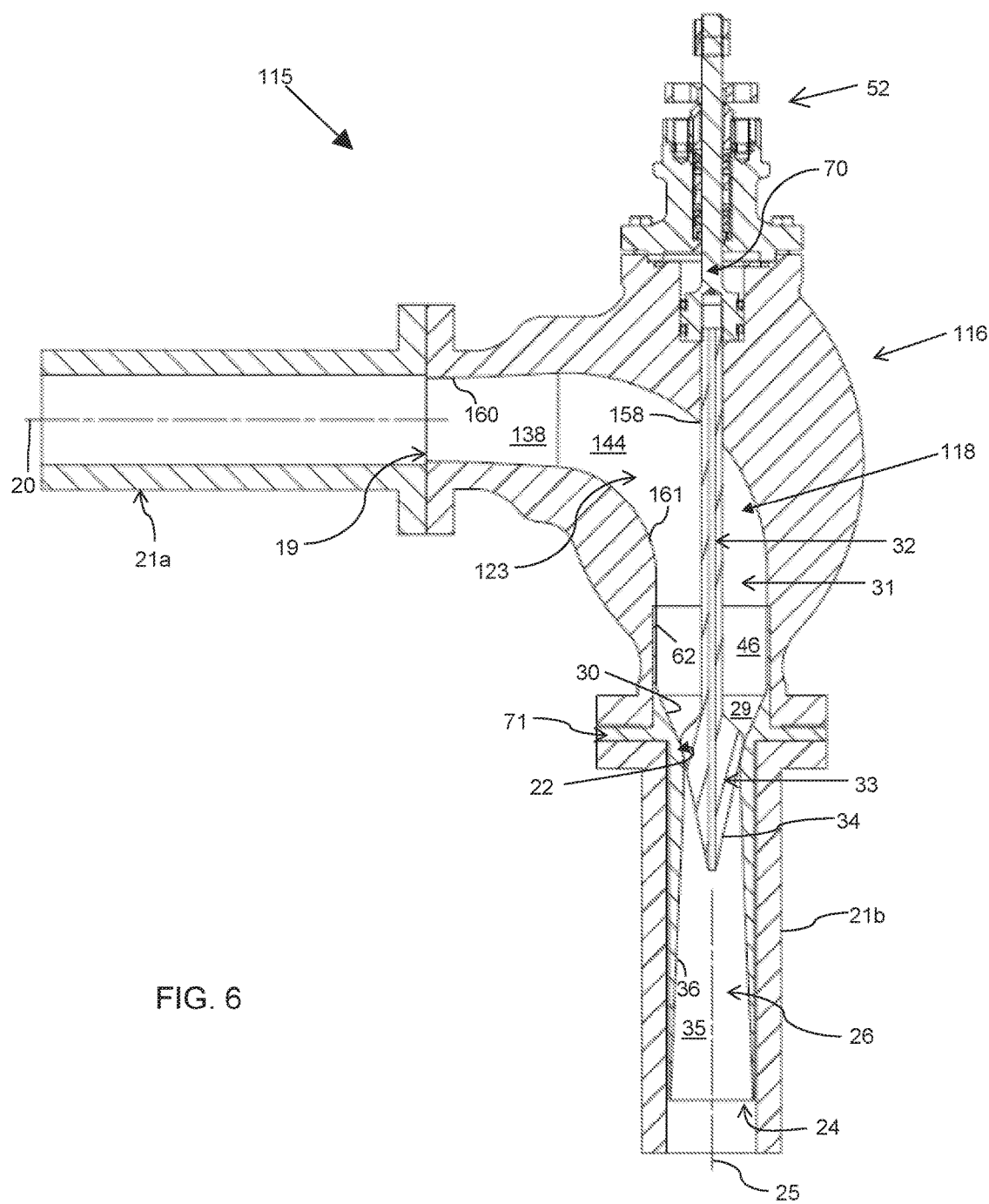
FIG. 6 is a vertical section view of a second embodiment of the flow control valve shown in FIG. 2.
Figure 7:
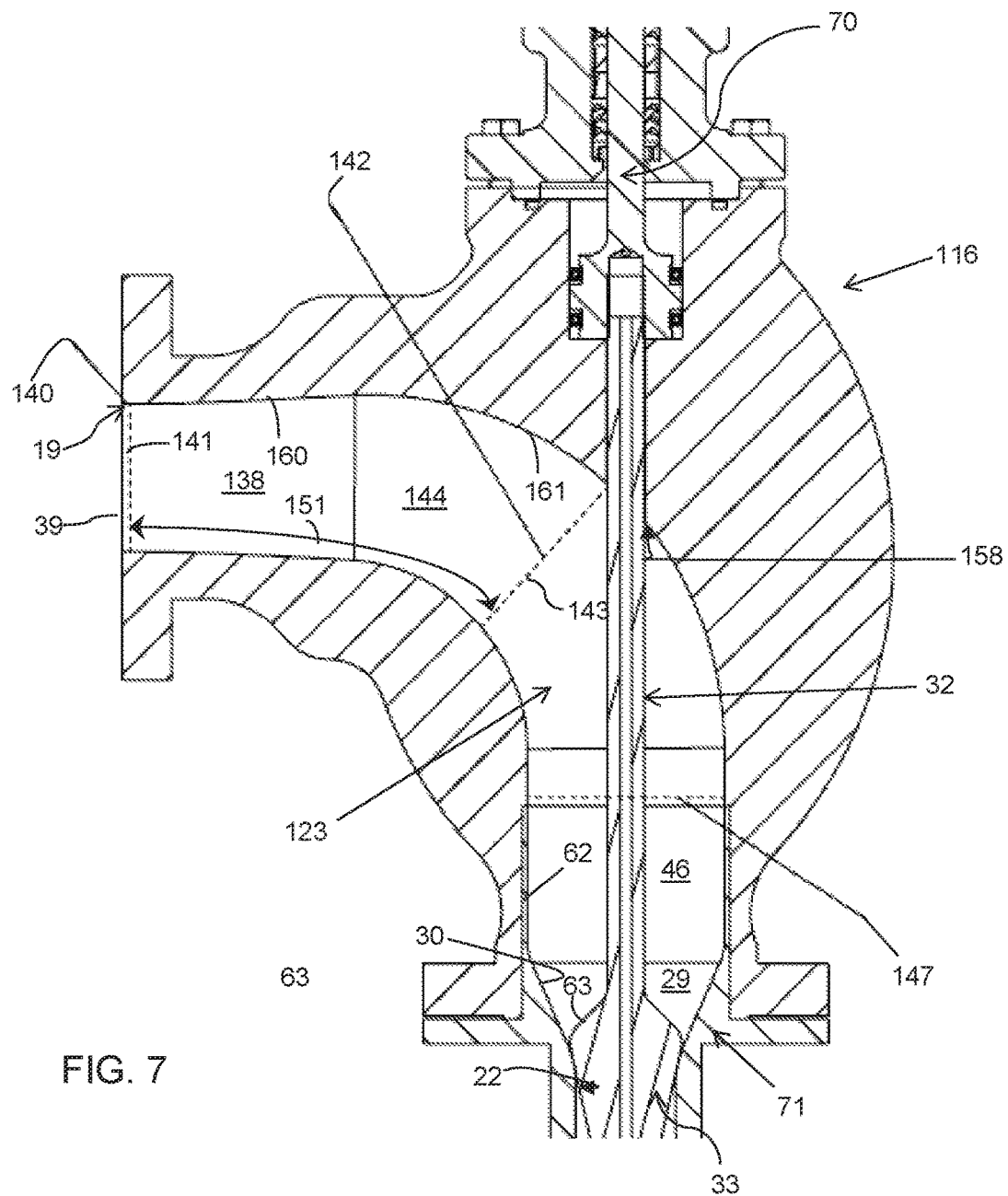
FIG. 7 is an enlarged view of the inlet passage of the flow control valve shown in FIG. 6.
Figure 8:
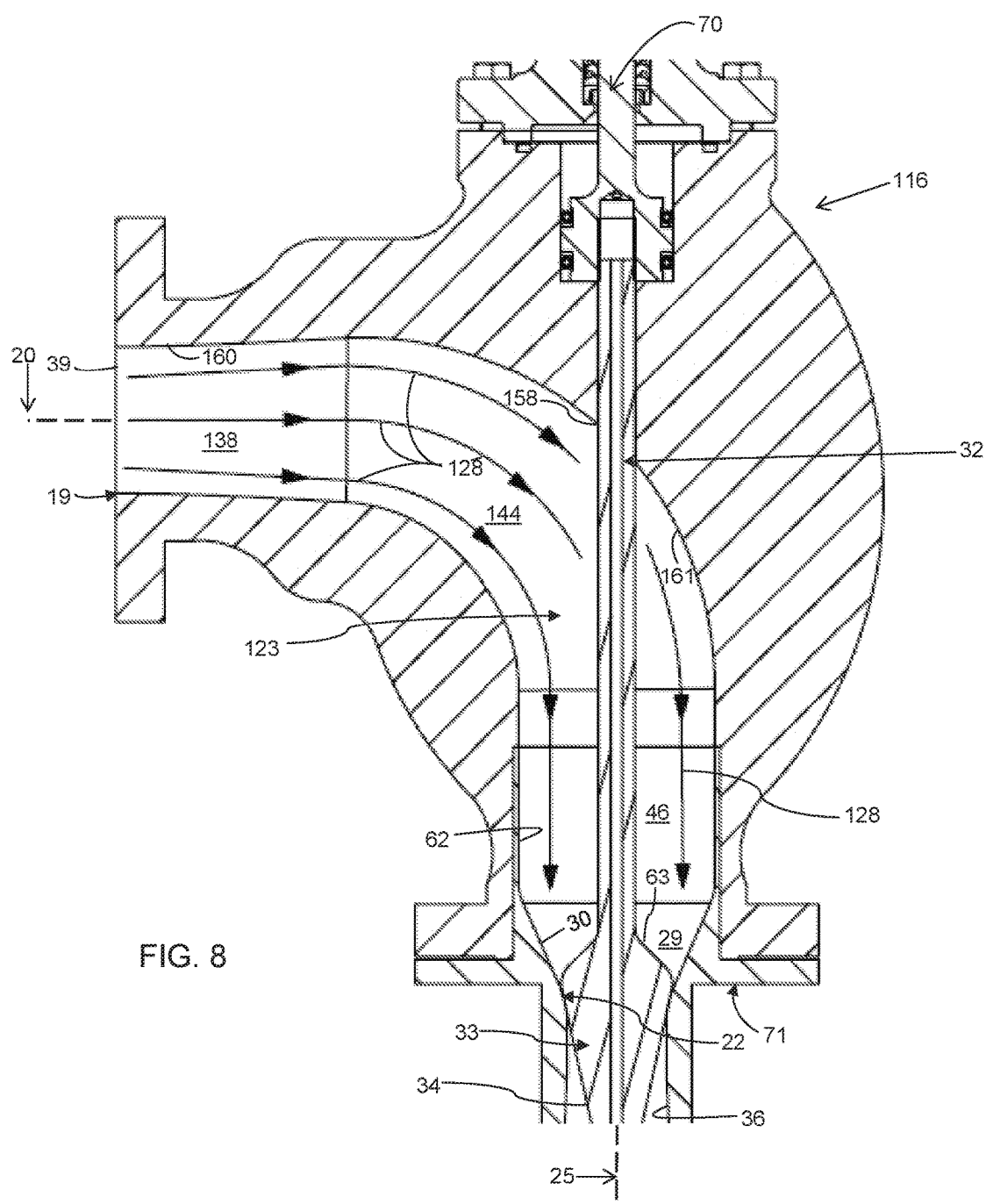
FIG. 8 is a further enlarged view of the widening portion of the inlet passage shown in FIG. 7.

FIGS. 6-8 show a second embodiment 115. Valve 115 is similar to valve 15, differing only with respect to the configuration of the inlet passage. As shown, inlet passage 123 extends from inlet port 19 at the junction with valve inlet conduit 21a to throat 22, and consists of, moving upstream to downstream from inlet port 19, first widening passage 138, second widening and bending passage 144, cylindrical passage 46, and nozzle passage 29.

First inlet widening passage 138 of inlet passage 123 is defined by rightwardly and inwardly facing frusto-conical surface 160. The cross-sectional area of first widening passage 138, taken in a plane generally perpendicular to the flow path, increases with distance downstream from inlet 19. Second widening and bending passage 144 continues to widen from first widening passage 138 and is defined by widening and curved circular cross-sectional surface 161. Surface 160 is joined at its right annular end to the left annular end of curved surface 161. Passages 138 and 144 thereby continue to increase linearly in cross-sectional area in a plane taken perpendicular to the flow path with distance downstream from inlet 19, from narrowest point 140 on plane 141 to widest point 147. Accordingly, by way of example, the cross-sectional area at section 142 taken on plane 143 a distance 151 downstream from section 140 is greater than the cross-sectional area at section 140 taken on plane 141. This widening downstream of inlet 19 and inlet plane 39 again provides a number of benefits with respect to flow downstream through throat 22. As shown, the point or section of widening passages or portions 138 and 144 of inlet passage 123 having the greatest cross-sectional area at cross-section 147, immediately preceding cylindrical passage 46, which leads into nozzle 29 of inlet passage 123. Thus, in this embodiment, widening portions 138 and 144 of inlet passage 123 increase in cross-sectional area continuously and linearly with distance downstream from inlet port 19.

As in first embodiment 15, surfaces 160 and 161 have a continuous uninterrupted circular cross-section except solely for stem port 158. As shown, surface 161 is broken only by stem port 158, through which valve stem 32 extends and moves linearly with linear movement of actuator shaft 70. As shown, bending passage 144 turns the flow ninety degrees from flowing generally parallel to input axis 20 to flowing generally parallel to output axis 25. The bottom annular end of surface 161 is joined to the top annular end of cylindrical surface 62. Cylindrical passage 46 is defined by inwardly-facing cylindrical surface 62. The bottom annular end of surface 62 is joined to the top annular end of nozzle surface 30.

Other types of actuator may be used as alternatives to linear actuator 52. For example, a rotary electro-mechanical actuator configured to actuate plug 33 may be used. In this embodiment, an electric motor having a stator and a rotor is connected through a rotary to linear mechanical converter to stem 32 and plug 33. For example, the electric motor may be mechanically connected to rotate a shaft which has continuous helical threads machined on its circumference running along its length. A ball nut with corresponding helical threads may be threaded onto the rotary shaft and the prevented from rotating with the shaft such that, when the shaft is rotated, the nut is driven along the threads of the shaft. The direction of motion of the ball nut depends on the direction of rotation of the shaft and therefor the directional rotation of the rotor of the motor. The top of stem 32 is attached to the ball nut, such that rotational motion of the motor can be converted to linear displacement of valve plug 33.

As another alternate embodiment, an electro-hydrostatic actuator (EHA) may be used. An EHA is a fully self-contained actuation system that receives power from an electrical source and transform an input command (usually electrical) into motion. It includes a servo-motor, a hydraulic pump, a reservoir and/or accumulator, and a servo-motor. In this embodiment, a servo-motor is used to drive the reversible pump. The pump pressurizes a working fluid, typically hydraulic oil, directly raising the pressure in a hydraulic gap on one side or the other of a tab, which causes stem 32 to move up or down as desired. The entire system comprises the pump, the servo-motor and a reservoir of hydraulic fluid, which is packaged into a single self-contained unit. Instead of energy needed to move the controls being supplied by an external hydraulic supply, it is supplied over normal electrical wiring. The EHA draws power when it is being moved, but pressure is maintained internally when the motor stops.

As another alternative, an electro-hydraulic actuator (EH) may be used to control movement of stem 32 and plug 33. The electro-hydraulic actuator generally comprise control electronics which create a command input signal, a servo-amplifier which provides a low power electrical actuating signal which is the difference between the command input signal and a feed-back signal generated by a feed-back transducer, a servo valve which responds to this low power electrical signal and controls the flow of hydraulic fluid to stem 32 to position plug 33, and a power supply, generally an electrical motor and a pump, which provides the flow of a hydraulic fluid under high pressure. The feed-back transducer measures the output position of the actuator and converts this measurement into a proportional signal which is sent back to the servo-amplifier.

As another alternative, the actuator may be a conventional hydraulic actuator. With a hydraulic actuator, an unbalanced pressure applied to valve stem 32 generates the force to move valve stem 32 and plug 33 between the open and closed position.

The present disclosure contemplates that many changes and modifications may be made. Therefore, while embodiments of the improved flow control valve have been shown and described, and a number of alternatives discussed, persons skilled in this art will readily appreciate that various additional changes and modifications may be made without departing from the scope of the invention, as defined and differentiated by the following claims.

What is claimed is:

1. A flow control valve comprising:
a valve body having an internal flow passage comprising an inlet port orientated about an inlet axis, a valve throat, a curved inlet passage between said inlet port and said valve throat, an outlet port orientated about an outlet axis, and an outlet passage between said valve throat and said outlet port, wherein said internal flow passage forms a flow path between said inlet port and said outlet port;
said curved inlet passage comprising a narrowing nozzle passage upstream of said valve throat having an uninterrupted surface generally converging toward said valve throat;
a valve member moveably mounted at least partially within said valve throat and comprising a stem and a metering portion having an outer narrowing surface generally converging in a downstream direction and movable relative to said valve body to meter flow in said flow path through said valve throat;
said outlet passage comprising a widening diffuser passage downstream of said valve throat having a surface generally diverging away from said valve throat;
said curved inlet passage comprising a widening portion downstream of said inlet port and upstream of said narrowing nozzle passage to decelerate flow in said flow path through said widening portion;
said inlet port having a cross-sectional area in a plane generally perpendicular to said inlet axis; and
said widening portion widening from a first section having a first cross-sectional area in a plane generally perpendicular to said flow path that is equal to or greater than said cross-sectional area of said inlet port to a second section downstream a distance from said first section and having a second cross-sectional area in a plane generally perpendicular to said flow path that is greater than both said cross-sectional area of said inlet port and said cross-sectional area of said first section of said widening portion.

2. The flow control valve set forth in claim 1, wherein said curved inlet passage comprises a bending portion curving downstream away from said inlet axis of said inlet port and wherein said widening portion of said curved inlet passage is upstream of said bending portion of said curved inlet passage.

3. The flow control valve set forth in claim 1, wherein said respective surfaces of said narrowing nozzle passage and said widening diffuser passage comprise linear angled sides or non-linear sides.

4. The flow control valve set forth in claim 3, wherein said respective surfaces of said narrowing nozzle passage and said widening diffuser passage comprise a frusto-conical surface or a concaved curved surface.

5. The flow control valve set forth in claim 1, wherein said narrowing nozzle passage has a nozzle cross-sectional area in a plane perpendicular to said flow path that increases with a distance upstream from said valve throat.

6. The flow control valve set forth in claim 1, wherein said widening diffuser passage has a cross-sectional area in a plane perpendicular to said flow path that increases with a distance downstream from said valve throat.

7. The flow control valve set forth in claim 1, wherein said valve member and said valve throat are axially aligned on a common axis extending generally perpendicular to said inlet axis.

8. The flow control valve set forth in claim 7, wherein said outlet axis is aligned on said common axis with said valve member and said valve throat.

9. The flow control valve set forth in claim 1, and comprising an actuator connected to said stem of said valve member and configured to move said metering portion between a closed position and an open position.

10. The flow control valve set forth in claim 9, wherein said actuator is selected from a group consisting of a linear actuator, an electro-mechanical actuator, an electro-hydrostatic actuator, an electro-hydraulic linear actuator and a hydraulic linear actuator.

11. The flow control valve set forth in claim 1, wherein said curved inlet passage is defined by a surface consisting of a valve stem port and a circular cross-section in a plane perpendicular to said flow path all along said flow path.

* * * * *